Feb. 25, 1958 C. C. GRIFFITH 2,824,645
DEWATERING SEWAGE SCUM
Filed Aug. 11, 1955 3 Sheets-Sheet 1

INVENTOR
Charles C Griffith
BY Henry H Snelling
ATTORNEY

United States Patent Office 2,824,645
Patented Feb. 25, 1958

2,824,645

DEWATERING SEWAGE SCUM

Charles C. Griffith, Arlington, Va.

Application August 11, 1955, Serial No. 527,669

6 Claims. (Cl. 210—66)

This invention relates to sewage systems of the type wherein scum is scraped from the surface of a primary settling tank and is transferred to a digester tank. It has for its principal object a method whereby to minimize the quantity of water taken from the primary settling tank with the scum and delivered to the digester, thereby improving the efficiency in the latter.

A further object of the invention is to depart from prior practice in that the scum trough to which the scum is directed by a chain conveyor is kept reasonably empty by a fairly steady removal of the scum from the trough and transferring this scum to a quiescent pool at or near the entry end of the primary settling tank where the scum can lose its water downwardly into the tank but cannot move laterally, this providing means whereby much of the water in the scum is transferred back to the settling tank and the scum in the pool is therefore concentrated.

A still further object of the invention is to transfer the concentrated scum from such a quiescent pool to the main sludge removal pipe leading from the sludge hopper of the primary settling tank to the digester, in which pipe it is further concentrated by draining through the pipe back into the hopper and is finally discharged through such pipe into the digester in a fairly dewatered, degased and concentrated condition.

Figure 1:
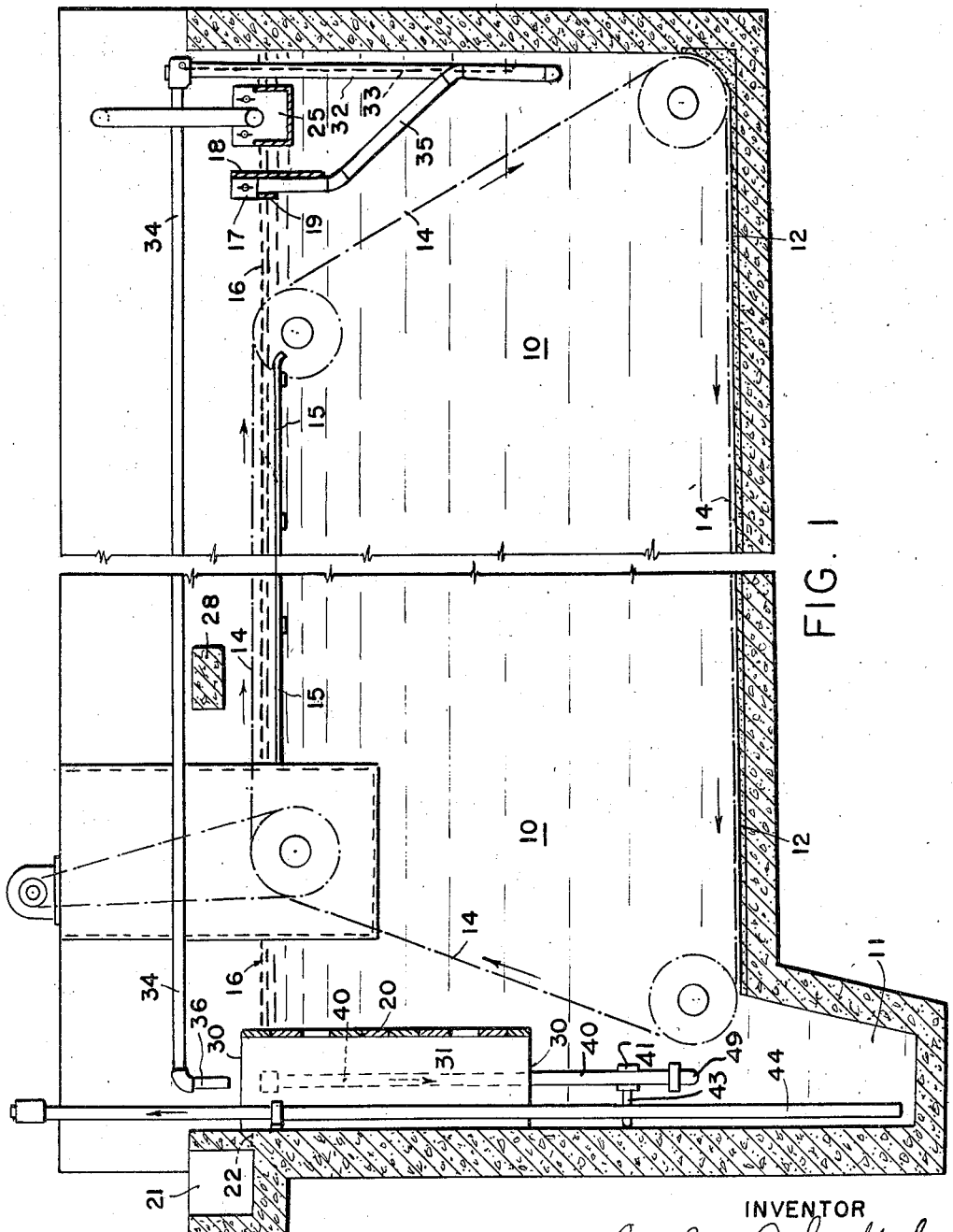
Figure 1 is a central vertical longitudinal section through a primary settling tank.

The primary settling tank 10 has at its entry end a sludge hopper 11 into which sludge falling to the bottom 12 of the tank is scraped by a chain conveyor 14 of usual type. The upper flight of the chain conveyor is guided by rails 15 so that scum forming at or above the normal water surface 16 will be directed into a scum receiving trough 17 formed in part by a baffle 18 extending above the water level and about two feet below it and in part by the forward baffle 19 which extends from the trough bottom to a point close to the water surface as is usual.

Figure 2:
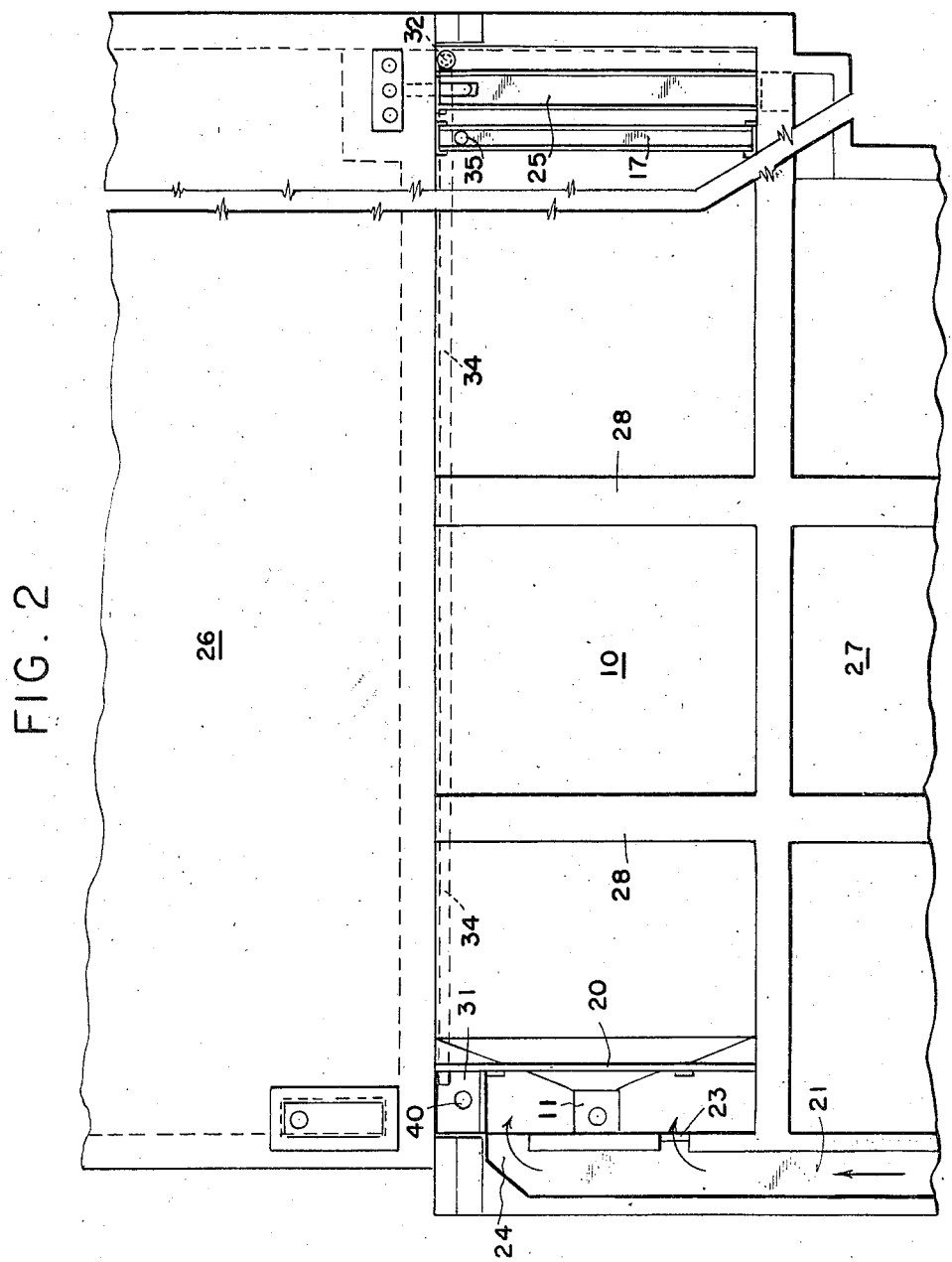
Figure 2 is a plan view of the tank.

At the front a perforated wooden baffle 20 of usual type extends entirely across the primary settling tank and serves to distribute the incoming sewage received from influent trough 21 through openings on both sides of the section on which Figure 1 is taken, these openings being indicated by the dotted line 22 in that figure. The general layout of the plant can best be seen from Figure 2. Sewage entering the plant from along the left hand side of the figure through influent trough 21 is discharged through the openings 23 and 24 and generally is deflected downwardly by the baffle 20 so that the heavier solids may pass directly to the sludge hopper 11. The sewage passing through and under the baffle 20 passes from left to right in Figures 1 and 2 and finally passes to the effluent trough 25 for subsequent treatment. The digester 26 is on one side of the primary settling tank and on the opposite side is, for example, the first stage aerator 27. The long primary settling tank walls are connected at intervals by walkways 28.

Referring again to Figure 1, scum collected by the flight chain conveyor 14 discharges into scum trough 17 in a quite wet condition. To transfer this scum direct to the digester as is the usual custom at this time is to add a large quantity of excessive water to the digester 26. Consequently, the scum by the present invention is dehydrated and degased by continuously passing it from the scum trough 17 to a quiescent pool 31 arranged in a corner of the primary settling tank 10 near the entry end and bounded on two sides by the walls of the tank, on the third side by the baffle 20 and on the fourth side near the intake 24 by a solid baffle 30. The pool 31 is therefore closed laterally on all four sides but is open at top and bottom so that water in scum collected in this pool 31 may readily drain down into the tank 10 and gas may escape above. There are no holes in baffle 20 from the solid baffle 30 to the proximate wall separating the primary settling tank from the digester. Any means may be used for transferring the wet scum to the pool 31, my preference being to use an air lift 32 fed by air pipe 33 and discharging into a long, horizontal scum line pipe 34 which may rest on the walkways 28 and empties into the quiescent pool 31. Pipe 35 leads into the bottom of scum trough 17 to the bottom of air lift 32. After air has been shut off from air pipe 45 leading to air lift 44 which draws sludge from hopper 11, air is discharged through pipe 43 at the bottom of air lift pipe 41 and this action draws partially dewatered scum and grease from the top of quiescent pool 31 downward through pipe 41 around the bend 49, up through pipe 41, and via horizontal pipe 42, past one-way valve 46 into pipe 44 gradually filling the same with the previously much dewatered scum. Upon standing in this pipe 44 additional water from the mixture drains into sludge hopper 11 and the scum and grease rise to the top of pipe 44 and are discharged ahead of the sludge from hopper 11 when air is later admitted to pipe 45.

As the scum in pool 31 becomes less wet through loss of water through the bottom of the pool, the dewatered scum is next drawn into an inverted U-tube 40—41 through air lift action. Discharge pipe 40 having its entry end in the pool near the water surface thereof communicates through a return bend 49 with air lift pipe 41 and this in turn leads via horizontal pipe 42 to the main sludge discharge pipe 44 which itself is an air lift receiving air through the smaller pipe 45. Preferably there is a check valve as at 46 to prevent any flow into the connecting pipe 42 when air lift 44 is being operated to transfer sludge from the hopper 11 to the sludge inspection box 47 through connecting pipe 48, the box 47 discharging directly into the digester 26 in usual fashion.

The operation of the device is as follows: The scraper 14 conveys sludge settling on the bottom 12 of the primary settling tank to the sludge hopper 11 and is later transferred to the digester a number of times per day in accordance with perfectly normal practice. The scum is pushed in the opposite direction to the scum box 17 from whence it is carried at such a rate as to keep the scum trough reasonably well emptied, the piping being 35 down to air lift 32, then up and through horizontal pipe 34 and outlet 36 to the quiescent pool 31. In this pool the water in the scum gradually sinks so the scum constantly becomes less wet and the drier scum and the greases rise to the top of the pool 31.

Since as much as about 90% of the material taken from the scum trough is organic matter which has risen from the bottom of the tank as it has gathered gas during the process known as bulking, and this material readily resettles as soon as its entrained gas is freed, the violent agitation in the transfer of the scum from the scum trough 17 to the pool 31 disassociates the gas from these organic solids so that the latter falls with the water and sinks at once into the sludge hopper, the scum losing much of its volume as it is discharged into the pool. The change in the color of the scum is marked, being quite dark at the scum trough but quite light in the pool. In this way both the objectionable odor which increases rapidly when the scum stands as in the prior art and the flies which apparently are not attracted by the lighter colored scum in the pool, are practically eliminated. As the amount of water necessary to move the scum varies with the length of the wier perimeter, it requires only about one-tenth as much water to move the scum from the pool through a four inch pipe as is needed to move the scum over a ten or twenty foot scum trough wier.

Figure 3:
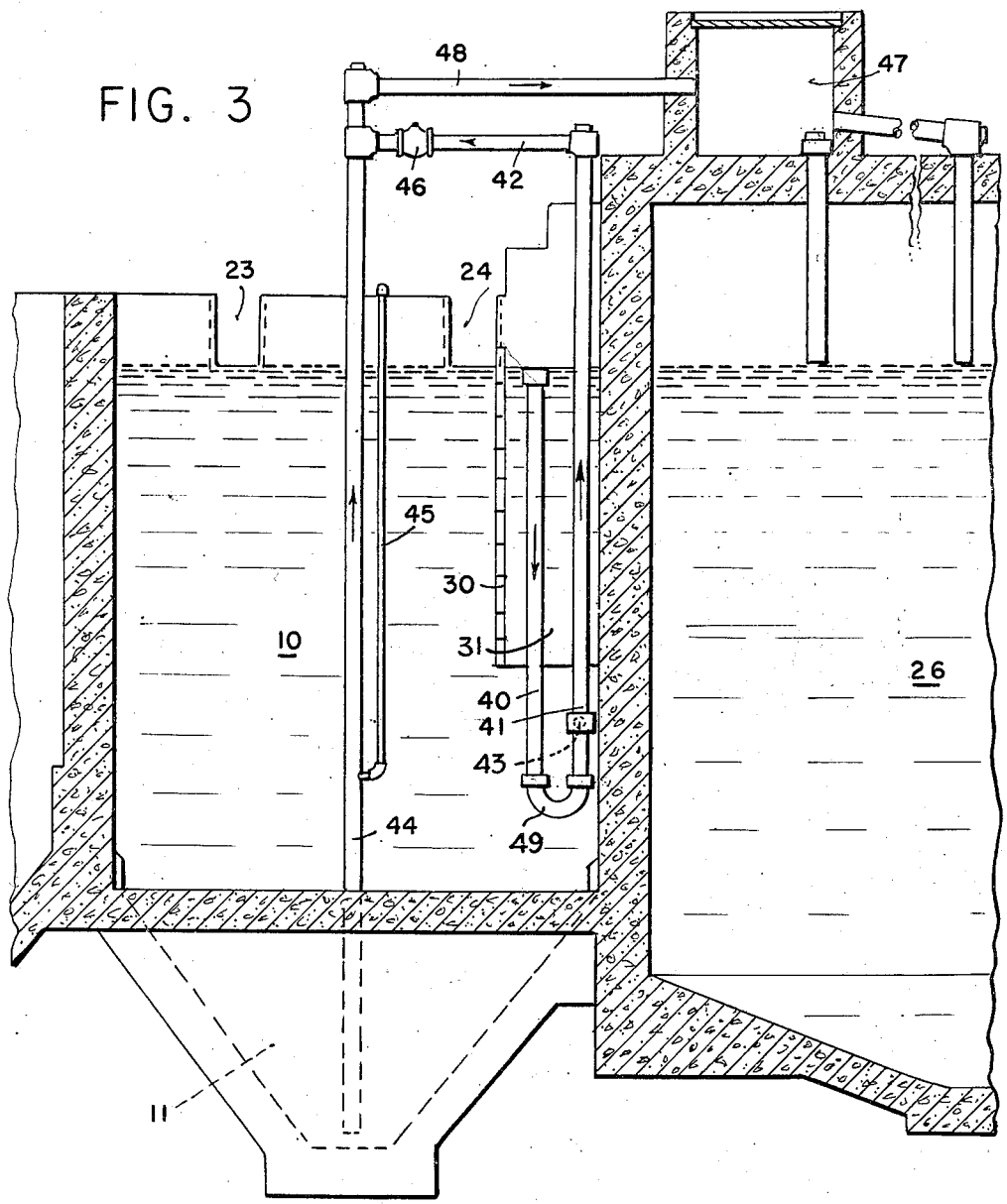
Figure 3 is a vertical transverse section through the primary settling tank near the sewage entry end.

The scum and the grease from the top of the pool 31 is now transferred by vertical pipe 40, best seen in Figure 3, to air lift 41 which discharges it past check valve 46 into vertical air lift 44, which becomes filled with partially dewatered grease and scum. Here again the sludge is dewatered upon standing, the water passing to the sludge hopper 11 from the bottom of pipe 44. Finally, air is admitted through air pipe 45 and the dewatered scum consequently is passed upward through air lift 44 and pipe 48 into the digester, followed by sludge from hopper 11.

What I claim is:

1. In a sewage system in which a scum layer is collected from the top of a primary settling tank and sludge from the bottom of the tank is discharged into a digester, the steps in the method of minimizing the amount of water carried to the digester with the scum, which comprise transferring the collected scum at the effluent end of the primary settling tank to a quiescent pool, maintaining the bottom of the pool in open communication with the tank contents while preventing lateral movement of the pool contents thus permitting water from the scum to pass out of the pool while holding the scum within the pool, then removing at intervals the partly dewatered scum from the top only of the pool and discharging it to the digester.

2. The step in the method of dewatering a mixture of scum and grease collected from a sewage treatment tank having a vertical sludge removing pipe having an open bottom within said tank and extending above the liquid level of the tank, which consists in filling the sludge removal pipe with collected scum and grease, holding the scum and grease within the pipe as the water from the mixture passes out said end by gravity until the scum and grease have risen to the top of the pipe in substantially dewatered condition, and then discharging the scum and grease with subsequent discharge of sludge.

3. In combination, a primary settling tank, means for collecting wet scum from the surface of the tank, means defining a quiescent pool within the tank surrounded by means and preventing lateral movement of the pool contents from the pool, said pool having an open bottom whereby heavier constituents of the pool contents may drain into the tank, means for transferring the collected wet scum to the pool, and means for withdrawing material from the top of the pool.

4. In combination, a digester, a primary settling tank having a sludge hopper and a scum trough, a conveyor having a lower flight conveying solids settling in the tank to the sludge hopper, and an upper flight directing scum to said scum trough, means defining a pool in the primary settling tank having an open bottom and top, said pool being closed on all sides to prevent lateral movement of the pool contents, means for transferring wet scum from the scum trough to the pool and piping means for withdrawing partially dewatered scum from the top of the pool to the digester.

5. In combination, a sewage treatment tank having a vertical sludge removal pipe, a number of closed sides extending above the liquid level in the tank and open at top and bottom, said closed sides defining a pool in said tank, a U-shaped pipe in the pool having its entry end just below the liquid level in the tank and pool and means including a check valve for intermittently discharging the contents of the U-shaped pipe into the sludge removal pipe, said U-shaped pipe having its bend below the entry end of the pipe.

6. In a sewage treatment system, a primary settling tank having a sludge hopper at its entry end, a scum trough near the effluent end, a sludge removal pipe leading from the sludge hopper, a pair of connecting baffles in one corner of the tank projecting above the water surface and terminating short of the tank bottom to form with the two proximate walls of said tank a quiescent pool above the hopper, means for discharging scum and grease from the scum trough to a point directly above the pool, means including a U-shaped pipe having its entry end just below the surface of the pool for discharging partially dewatered scum to the sludge removal pipe and means for intermittently emptying the sludge removal pipe when the material therein is further freed of its water contents as the grease rises in the sludge removal pipe to the water level in the tank.

References Cited in the file of this patent

UNITED STATES PATENTS

| Re. 19,146 | Tark | Apr. 24, 1934 |
| 382,188 | Pitt | May 1, 1888 |
| 2,128,393 | Allen | Aug. 30, 1938 |
| 2,211,565 | Hawley | Aug. 13, 1940 |
| 2,226,532 | Hawley | Dec. 31, 1940 |

FOREIGN PATENTS

| 248,808 | Switzerland | Feb. 16, 1948 |